US008208387B2

(12) United States Patent
Stueve

(10) Patent No.: US 8,208,387 B2
(45) Date of Patent: Jun. 26, 2012

(54) LOW CURRENT METHOD FOR DETECTING PRESENCE OF ETHERNET SIGNALS

(75) Inventor: Vincent Stueve, Round Rock, TX (US)

(73) Assignee: Micrel, Inc., San Jose, CA (US)

( * ) Notice: Subject to any disclaimer, the term of this patent is extended or adjusted under 35 U.S.C. 154(b) by 1336 days.

(21) Appl. No.: 11/846,781

(22) Filed: Aug. 29, 2007

(65) Prior Publication Data

US 2009/0059948 A1 Mar. 5, 2009

(51) Int. Cl.
*H04L 1/00* (2006.01)
(52) U.S. Cl. ........................ 370/251; 725/107
(58) Field of Classification Search .................. 370/251; 725/107
See application file for complete search history.

(56) References Cited

U.S. PATENT DOCUMENTS

| 4,766,386 A * | 8/1988 | Oliver et al. .................. 324/533 |
| 2004/0066790 A1 * | 4/2004 | Valavi et al. .................. 370/419 |

* cited by examiner

*Primary Examiner* — Yemane Mesfin
*Assistant Examiner* — Wanda Z Russell
(74) *Attorney, Agent, or Firm* — Patent Law Group LLP; Carmen C. Cook

(57) ABSTRACT

A signal detection circuit for an Ethernet physical layer transceiver (PHY) device includes a first capacitor AC coupling a signal on the first receive terminal of the Ethernet PHY device to a first node; a second capacitor AC coupling a signal on the second receive terminal to a second node; re-biasing resistors for re-biasing the AC-coupled signals on the first and second nodes; first and second gain stages for amplifying the AC coupled signals; and a peak detect circuit. The peak detect circuit includes first and second diodes receiving the amplified signals from the gain stages to charge a peak detect capacitor. The signal detection circuit includes a comparator for comparing the voltage on the peak detect capacitor to a reference voltage and providing an output signal being indicative of the presence or absence of a signal on the first and second receive terminals of the Ethernet PHY device.

10 Claims, 2 Drawing Sheets

LOW CURRENT METHOD FOR DETECTING PRESENCE OF ETHERNET SIGNALS

FIELD OF THE INVENTION

The invention relates to data communication networks and, in particular, to a method for detecting the presence of Ethernet signals on a CAT-5 cable.

DESCRIPTION OF THE RELATED ART

Data communication networks, such as local area networks (LANs), are well known in the art for use in interconnecting network devices to facilitate data communication between two or more network devices. Ethernet, described by IEEE standard 802.3, is one of the most commonly used local area networking scheme. Ethernet standard under IEEE 802.3 defines a number of wiring and signaling standards for the physical layer, through means of network access at the Media Access Control (MAC)/Data Link Layer, and a common addressing format. Ethernet incorporates a variety of cabling schemes. In general, in a 10Base-T Ethernet or 100Base-TX Ethernet, Category 5 (Cat 5) wiring is used. A Cat 5 cable is a unshielded twisted pair cable containing four twisted wire pairs. The Cat 5 cables are connected to network devices using RJ45 connectors.

The physical layer of an Ethernet data communication network is the most basic network layer, providing only the means of transmitting raw bits over a physical data link connecting network nodes. The bit stream may be grouped into code words or symbols, and converted to a physical signal, which is transmitted over a physical transmission medium. The physical layer provides an electrical, mechanical, and procedural interface to the transmission medium. The shapes of the electrical connectors, which frequencies to broadcast on, what modulation scheme to use and similar low-level parameters are specified at the physical layer of the Ethernet communication system. In general, the physical layer is realized in the form of a physical layer transceiver (PHY) for implementing the interfaces to transmit over and receive data from the transmission medium. In the following description, the term "Ethernet PHY" is used to refer to the physical layer transceiver in an Ethernet data network.

In portable applications that require Ethernet connectivity, it is desirable to turn off the Ethernet PHY device when the cables are not connected in order to conserve battery power. Ethernet standards specify several power savings modes for the Ethernet PHY devices. First, the "Power Down" mode is activated by writing to Register 0 bit 11 of the MDIO register set as defined by the IEEE 802.3 PHY management interface. In the power down mode, the Ethernet PHY device disables all internal functions and drives the output pins to a logical zero, except for the MII serial management interface (MDC/MDIO) which is kept alive so the user can wake the transceiver up. Most manufacturers of Ethernet PHY devices also allow access to this mode via an external I/O pin to the transceiver device. Second, the "Power Saving" mode is available on most Ethernet PHY devices and typically turns off all circuitry except for the Energy Detect and PLL circuits. Upon a cable insertion and the detection of energy, the PHY device is able to quickly wake up and initiate a link.

Of the two power saving modes, the power down mode generally offers the lowest current consumption, in the range of 3 mA to 5 mA. However, this amount of power down current is excessive for battery operated systems. Battery operated systems need to have standby current consumption of much less than 3 mA to 5 mA.

SUMMARY OF THE INVENTION

According to one embodiment of the present invention, a signal detection circuit for an Ethernet physical layer transceiver device includes a first capacitor coupled between a first receive terminal of the Ethernet physical layer transceiver and a first node where the first capacitor AC couples a signal on the first receive terminal to the first node; a second capacitor coupled between a second receive terminal of the Ethernet physical layer transceiver and a second node where the second capacitor AC couples a signal on the second receive terminal to the second node; first and second resistors connected serially between a positive power supply voltage and a ground voltage where a common node between the first and second resistors is connected to the first node; third and fourth resistors connected serially between the positive power supply voltage and the ground voltage where a common node between the third and fourth resistors is connected to the second node; a first gain stage having an input terminal coupled to the first node and an output terminal; a second gain stage having an input terminal coupled to the second node and an output terminal; a first diode having an anode coupled to the output terminal of the first gain stage and a cathode coupled to a third node; a second diode having an anode coupled to the output terminal of the second gain stage and a cathode coupled to the third node; a third capacitor coupled between the third node and the ground voltage; and a comparator having an input terminal coupled to the third node and for comparing the voltage on the third capacitor to a reference voltage. The comparator provides an output signal being indicative of the presence or absence of a signal on the first and second receive terminals of the Ethernet physical layer transceiver device.

According to another aspect of the present invention, a method for detecting the presence of a signal on first and second receive terminals of an Ethernet physical layer transceiver (PHY) device includes AC coupling signals on the first receive terminal of the Ethernet PHY device to a first node; AC coupling signals on the second receive terminal of the Ethernet PHY device to a second node; amplifying the AC-coupled signal on the first node to generate a first amplified AC-coupled signal; amplifying the AC-coupled signal on the second node to generate a second amplified AC-coupled signal; charging up a capacitor using the first and second amplified AC-coupled signals; comparing the voltage on the capacitor to a reference voltage; and asserting an indicator signal when the voltage on the capacitor is greater than the reference voltage.

The present invention is better understood upon consideration of the detailed description below and the accompanying drawings.

DETAILED DESCRIPTION OF THE PREFERRED EMBODIMENTS

In accordance with the principles of the present invention, a low current signal detection circuit for an Ethernet physical layer transceiver device for detecting the presence of Ethernet signals includes AC coupled capacitors and a peak detect circuit to detect the presence of sufficient energy on the network cable. The signal detection circuit enables detection of Ethernet activity on the network cable, such as a CAT 5 cable, while consuming less than 100 µA of current. The signal detection circuit provides a notification to the system to wake up the Ethernet physical layer device when sufficient energy is detected to indicate the presence of active signals on the network cable.

A significant benefit of the signal detection circuit of the present invention is that considerable amounts of current are saved over the traditional Power Down mode offered via access to the Ethernet PHY device with the MDIO interface or I/O pins. The signal detection circuit of the present invention is advantageous for battery powered network devices where power conservation is critical.

The low current signal detection circuit of the present invention can be built separate from the integrated circuit of an Ethernet PHY device or the signal detection circuit can be integrated onto the Ethernet PHY device. Furthermore, the low current signal detection circuit of the present invention can be constructed using discrete components or the circuit can be formed as an integrated circuit.

Figure 1:
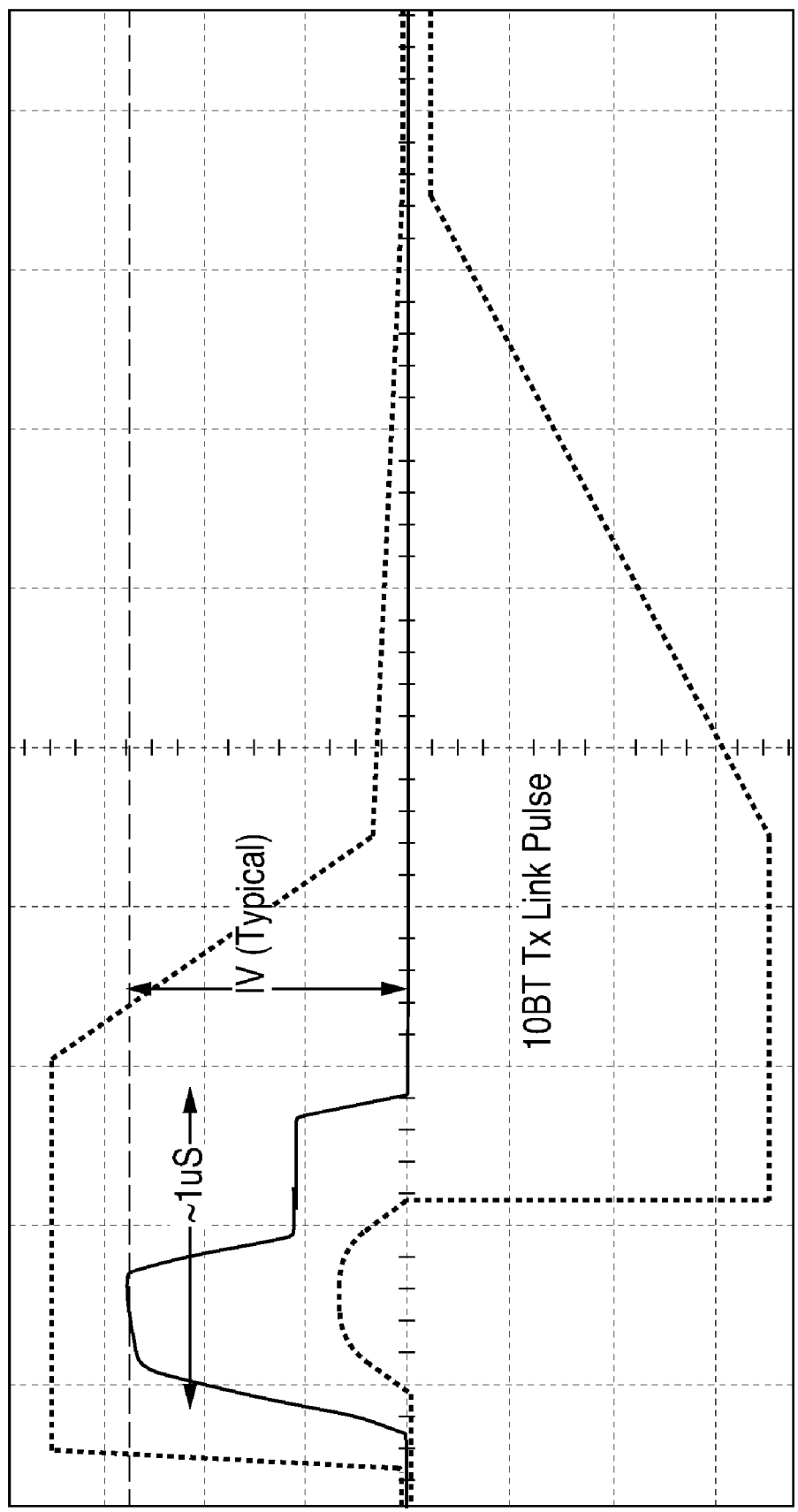
FIG. 1 illustrates the signal waveform of an Ethernet 10Base-T link pulse.

Before describing the signal detection circuit, the nature of Ethernet signaling is first described. Upon insertion of a CAT-5 cable into an RJ45 connector, a 10Base-T Normal Link Pulse (NLP) is sent between the two connecting network devices in order to verify a working connection. In the event that both ends of the cable are connected to operating network devices, the link pulse occurs at an interval of 16±8 µs and has a pulse shape as shown in FIG. 1. In FIG. 1, the solid line shows a 10Base-T link pulse with rising edge pre-emphasis and the dotted line shown the allowable region under Ethernet standards where the link pulse can be formed.

If these link pulses are detected by the connected network device, then the network devices initiate auto-negotiation process, whereby the two connected devices decide upon the speed and the communication mode, such as full or half duplex. If only one network device is sending link pulses and the pulses come at approximately 68 µS intervals, then there is an indication that there is no demonstrated link at the other end of the cable.

Figure 2:
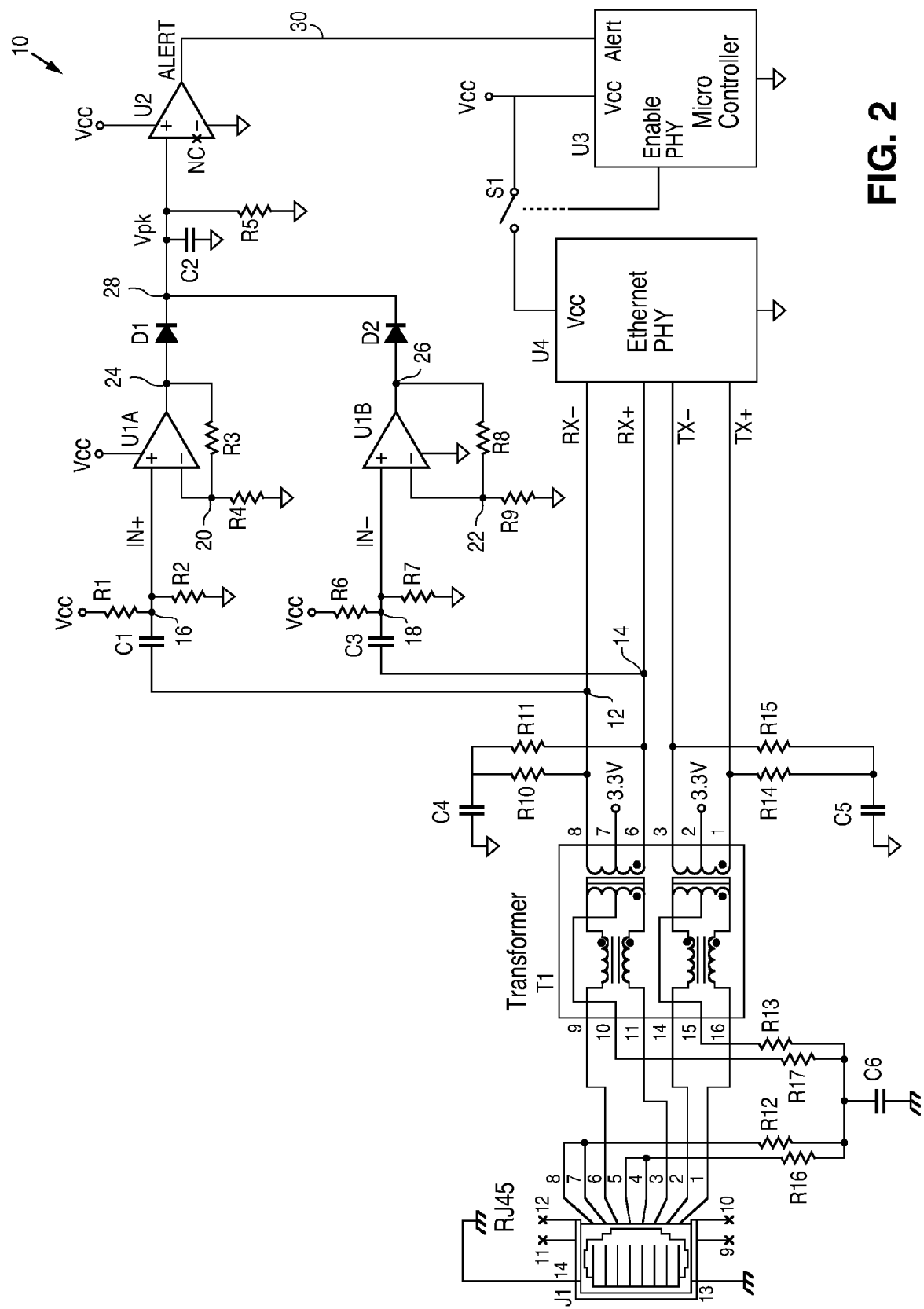
FIG. 2 is a circuit diagram of the low current signal detection circuit coupled to an Ethernet physical layer transceiver according to one embodiment of the present invention.

FIG. 2 is a circuit diagram of the low current signal detection circuit coupled to an Ethernet physical layer transceiver according to one embodiment of the present invention. Referring to FIG. 2, an Ethernet physical layer transceiver (PHY) U4 includes transmit terminals TX+ and TX− and receive terminals RX+ and RX− coupled to terminals of a transformer T1 which is in turn coupled to an RJ45 connector to be coupled to a CAT 5 cable. When a cable is connected to the RJ45 connector, incoming and outgoing signals are coupled through transformer T1 to Ethernet PHY device U4.

When Ethernet PHY device U4 is unpowered, the TX and RX terminals are essentially high impedance inputs such that when a cable is plugged into an Ethernet port, such as the RJ45 connector, the link pulses can be detected passively. There is inherently some attenuation of the link pulse due to leakage effects at the Ethernet PHY device. However, the signal detection circuit of the present invention utilizes small AC coupling capacitors to detect the link pulses. When the small AC coupling capacitors are coupled to the receive RX+/− terminals of the un-powered Ethernet PHY device, the link pulse can be detected and used to alert the system to wake up and look for Ethernet connectivity.

Referring again to FIG. 2, low current signal detection circuit 10 includes AC coupling capacitors C1 and C3 coupled to respective receive terminals RX− and RX+ of Ethernet PHY device U4 for sensing the presence of link pulses on the RX+ and RX− terminals of the Ethernet PHY device U4. More specifically, capacitor C1 is connected across node 12 (RX−) and a node 16 while capacitor C3 is connected across node 14 (RX+) and a node 18. The incoming link pulses are AC coupled through capacitors C1 and C3 to nodes 16, 18 as input signals IN+ and IN−, respectively. Capacitors C1 and C3 are small value capacitors. In the present embodiment, the capacitance of capacitors C1 and C3 is less then 0.01 µF. In one embodiment, the capacitance of capacitors C1 and C3 is 0.01 µF. By using AC coupling capacitors of a small capacitance value, the capacitive loading to the RX+ and RX− terminals is reduced, thereby preserving signal integrity.

The detected signals IN+ and IN− are re-biased by resistors R1, R2, R6 and R7. More specifically, resistors R1 and R2 are connected in series between the positive power supply Vcc voltage and the ground voltage with the common node between the two resistors coupled to node 16. Resistors R6 and R7 are connected in series between the positive power supply Vcc voltage and the ground voltage with the common node between the two resistors coupled to node 18. The re-biasing resistors R1, R2, R6 and R7 are of high impedance and operate to limit the amount of current required to re-bias the detected signals IN+ and IN−.

The detected signals are to be processed by an analog peak detect circuit to create a digital indication of Link Pulse activity. However, the detected signals IN+ and IN− are first coupled to a gain stage to amplify the signals to ensure that the detected signals have sufficient energy to charge the output sampling capacitor in the peak detect circuit.

In the present embodiment, the gain stage is implemented using operational amplifiers (opamps) configured as noninverting amplifiers. Detected signal IN+ is coupled to the non-inverting input terminal of a first opamp U1A. The inverting input terminal (node 20) and the output terminal of opamp U1A are connected in a feedback loop with resistors R3 and R4. As thus configured, the gain of the opamp gain stage is given as: 1+R3/R4. In one embodiment, resistor R3 is equal to resistor R4 and a 2× gain at opamp U1A is realized. On the other hand, the detected signal IN− is coupled to the non-inverting input terminal of a second opamp U1B. The inverting input terminal (node 22) and the output terminal of opamp U1B are connected in a feedback loop with resistors R8 and R9. Similarly, the gain of the opamp gain stage is given as: 1+R8/R9.

Because there is a large impedance on the re-biasing network of resistors R1, R2, R6 and R7, opamps with low input bias should be used for the gain stages. That is, opamp U1A and U1B need to have low input offset, low quiescent current and high gain bandwidth. In one embodiment, opamps U1A and U1B are implemented using Ultra Low Power Op Amp, Part No. AD8038, available from Analog Devices, Norwood, Mass.

The amplified signals from the gain stages are coupled to the peak detect circuit formed by diodes D1, D2, capacitor C2 and resistor R5. Diode D1 has an anode coupled to receive the output signal from opamp U1A and a cathode coupled to a node 28. Diode D2 has an anode coupled to receive the output signal from opamp U1B and a cathode coupled to node 28. Diodes D1 and D2 have a forward bias voltage drop of about 1V. Thus, any signal pulse at the gain stage output that has energy above the 1V forward bias voltage of the diodes D1, D2 will send a burst of energy to the peak detect capacitor C2.

The voltage Vpk charged onto peak detect capacitor C2 is coupled to the input terminal of a comparator U2. In the present embodiment, comparator U2 is a comparator with an internal reference voltage and therefore an external reference voltage needs not be provided and the negative input terminal of the opamp is not connected (NC). In one embodiment, the internal reference voltage of the comparator is 1.24V. Thus, when enough voltage is stored on capacitor C2 to cause voltage Vpk to increase above the reference voltage of 1.24V, the output signal (node 30) of comparator U2 will be asserted. The output signal of comparator U2 is the ALERT signal indicating that a valid signal is detected on the connected cable.

In the peak detect circuit, resistor R5 is a large impedance "bleeding resistor" used to discharge capacitor C2 if link pulses are not present, thereby maintaining the voltage Vpk to be below the reference voltage of comparator U2. In one embodiment, comparator U2 is implemented using Comparator with Reference, Part No. MIC842, available from Micrel Inc., San Jose, Calif.

The ALERT signal (node 30) is provided to a microcontroller U3. In the present embodiment, microcontroller U3 controls a switch S1 which is coupled between the power supply terminal of Ethernet PHY device U4 and the power supply voltage Vcc. When no link pulses are detected, microcontroller U3 causes switch S1 to open, thereby discontinuing the power supply to Ethernet PHY device U4. By cutting off the power to the Ethernet PHY device completely, significant power saving is achieved. When the ALERT signal is asserted, microcontroller U3 responds by closing switch S1 to deliver power to the Ethernet PHY device U4. Ethernet PHY device U4 thereby initiates the flow of Ethernet traffic.

In one embodiment, switch S1 is a low quiescent current switch. For instance, in one embodiment, switch S1 is implemented using high side power switches, Part No. MIC94061, available from Micrel Inc., San Jose, Calif.

The overall operation of the signal detection circuit is as follows. Signals on the receive RX+ and Rx− terminals of the Ethernet PHY device are AC coupled through capacitors C1 and C3 and re-biased by the respective resistor networks R1/R2, R6/R7. The AC-coupled signals are then amplified by respective gain stages and then provided to a peak detect circuit. The amplified AC-coupled signals charge up a peak detect capacitor until a reference voltage level is reach. When sufficient energy is present on the receive terminals, the voltage on the peak detect capacitor is large enough to trigger a comparator threshold and an Alert signal indicative of the presence of valid signals on the receive terminals is asserted. The Alert can then be used to wake up the Ethernet PHY device by initiating the supply of power to the Ethernet PHY device.

The above detailed descriptions are provided to illustrate specific embodiments of the present invention and are not intended to be limiting. Numerous modifications and variations within the scope of the present invention are possible. The present invention is defined by the appended claims.

I claim:

1. A signal detection circuit for an Ethernet physical layer transceiver device comprising:
   a first capacitor coupled between a first receive terminal of the Ethernet physical layer transceiver and a first node, the first capacitor AC coupling a signal on the first receive terminal to the first node;
   a second capacitor coupled between a second receive terminal of the Ethernet physical layer transceiver and a second node, the second capacitor AC coupling a signal on the second receive terminal to the second node;
   a first gain stage having an input terminal coupled to the first node and an output terminal;
   a second gain stage having an input terminal coupled to the second node and an output terminal;
   a first diode having an anode coupled to the output terminal of the first gain stage and a cathode coupled to a third node;
   a second diode having an anode coupled to the output terminal of the second gain stage and a cathode coupled to the third node;
   a third capacitor coupled between the third node and the ground voltage; and
   a comparator having an input terminal coupled to the third node and for comparing the voltage on the third capacitor to a reference voltage, the comparator providing an output signal being indicative of the presence or absence of a signal on the first and second receive terminals of the Ethernet physical layer transceiver device.

2. The signal detection circuit of claim 1, wherein the output signal of the comparator has a first state when the voltage on the third capacitor is less than the reference voltage and a second state when the voltage on the comparator is greater than the reference voltage, the output signal having the second state indicating the presence of a signal on the first and second receive terminals of the Ethernet physical layer transceiver device.

3. The signal detection circuit of claim 2, further comprising:
   a switch coupled between a power supply terminal of the Ethernet physical layer transceiver device and the power supply voltage, the switch being controlled by a control signal; and
   a microcontroller receiving the output signal from the comparator and generating the control signal to cause switch S1 to close when the output signal of the comparator has the second state.

4. The signal detection circuit of claim 3, wherein the microcontroller generates the control signal to cause switch S1 to open when the output signal of the comparator has the second state, thereby discontinuing power supply to the Ethernet physical layer transceiver device.

5. The signal detection circuit of claim 1, further comprising:
   first and second resistors connected serially between a positive power supply voltage and a ground voltage, a common node between the first and second resistors being connected to the first node; and
   third and fourth resistors connected serially between the positive power supply voltage and the ground voltage, a common node between the third and fourth resistors being connected to the second node.

6. The signal detection circuit of claim 1, further comprising a fifth resistor coupled between the third node and the ground voltage.

7. The signal detection circuit of claim 1, wherein the reference voltage comprises an internal reference voltage of the comparator.

8. The signal detection circuit of claim 1, wherein the first gain stage and the second gain stage each comprises:
   an operational amplifier having a noninverting input terminal being the input terminal of the gain stage, an inverting input terminal and an output terminal;
   a sixth resistor coupled between the inverting input terminal of the operational amplifier and the ground voltage; and
   a seventh resistor coupled between the inverting input terminal and the output terminal of the operational amplifier.

9. A method for detecting the presence of a signal on first and second receive terminals of an unpowered Ethernet physical layer transceiver (PHY) device comprising:

AC coupling signals on the first receive terminal of the Ethernet PHY device to a first node;

AC coupling signals on the second receive terminal of the Ethernet PHY device to a second node;

amplifying the AC-coupled signal on the first node to generate a first amplified AC-coupled signal;

amplifying the AC-coupled signal on the second node to generate a second amplified AC-coupled signal;

charging up a capacitor using the first and second amplified AC-coupled signals;

comparing the voltage on the capacitor to a reference voltage; and asserting an indicator signal when the voltage on the capacitor is greater than the reference voltage.

10. The method of claim 9 further comprising:

providing supply power to the Ethernet PHY device when the indicator signal is asserted.

* * * * *